(12) United States Patent
Smith

(10) Patent No.: US 6,786,670 B2
(45) Date of Patent: *Sep. 7, 2004

(54) THREADED CLOSURE

(75) Inventor: Michael Smith, Edmonton (CA)

(73) Assignee: Robbins & Myers Energy Systems, L.P., Houston, TX (US)

( * ) Notice: Subject to any disclaimer, the term of this patent is extended or adjusted under 35 U.S.C. 154(b) by 85 days.

This patent is subject to a terminal disclaimer.

(21) Appl. No.: 10/166,950

(22) Filed: Jun. 11, 2002

(65) Prior Publication Data

US 2003/0081993 A1 May 1, 2003

Related U.S. Application Data

(63) Continuation-in-part of application No. 10/017,966, filed on Oct. 30, 2001.

(51) Int. Cl.$^7$ ................................................ B65D 45/32
(52) U.S. Cl. .................... 403/323; 220/327; 292/256.5; 138/89
(58) Field of Search .............................. 403/321, 322.1, 403/322.3, 322.4, 323, 324, 325; 24/269, 270, 273; 292/256.5, 256.6, 256.65, 256.67, 256.73, 256.75, DIG. 11; 74/37, 89.2, 89.21, 89.22; 220/284, 286, 288, 327; 254/1, 213, 221, 224, 243, 251, 387; 138/89

(56) References Cited

U.S. PATENT DOCUMENTS

| 139,696 | A | * | 6/1873 | Paff ............................ 24/273 |
| 691,658 | A | * | 1/1902 | Newman ................... 24/273 X |
| 946,555 | A | * | 1/1910 | Muehlhausen et al. |
| 2,026,461 | A | * | 12/1935 | Combs |
| 2,121,881 | A | * | 6/1938 | Newton ................. 292/256.67 |
| 2,279,666 | A | * | 4/1942 | Etnyre |
| 2,309,769 | A | * | 2/1943 | Hubbard ................... 24/279 X |
| 2,375,685 | A | * | 5/1945 | Pennington ............... 24/273 X |
| 3,057,438 | A | * | 10/1962 | Wanner et al. |
| 4,423,992 | A | * | 1/1984 | Ankeny |
| 4,515,287 | A | * | 5/1985 | Baudoux et al. |
| 5,246,068 | A | * | 9/1993 | Besson |
| 6,007,120 | A | * | 12/1999 | Vogt et al. .......... 292/256.65 X |
| 6,454,117 | B1 | * | 9/2002 | Pysher et al. ....... 292/256.73 X |
| 6,663,149 | B1 | * | 12/2003 | White ..................... 292/256.5 |
| 2002/0170599 | A1 | * | 11/2002 | Disher et al. |
| 2003/0081991 | A1 | * | 5/2003 | Smith et al. |
| 2003/0081992 | A1 | * | 5/2003 | White et al. |

* cited by examiner

Primary Examiner—Lynne H. Browne
Assistant Examiner—Ryan M. Flandro
(74) Attorney, Agent, or Firm—Loren Helmreich; Browning Bushman, P.C.

(57) ABSTRACT

Methods and systems are provided for operating a vessel or pipeline closure. A closure 110 includes a hub 12 fixedly and sealingly secured to the vessel, and a cap 30 for threaded engagement with the hub 12. An anchor 122 may be fixedly secured to the hub, and a plurality of stops 132 each may be fixedly secured to a periphery of the cap 30. An end of a threaded rod 144 is attached to a selected stop, which may be a slot in the cap. A threaded collar 127 advances the threaded rod 144 axially, thereby rotating the cap 30 relative to the hub 12.

20 Claims, 6 Drawing Sheets

THREADED CLOSURE

The present application is a continuation-in-part of U.S. Ser. No. 10/017,966 filed Oct. 30, 2001.

FIELD OF THE INVENTION

The present invention relates to vessel or pipeline closures, which selectively enclose and seal an interior portion of a pressure containing vessel or pipeline. More particularly, the methods and systems of this invention relate to closures of the type used on pipeline pig launching and receiving systems, and closures used as access portals for pressurized vessels. The methods and system of this invention may improve safety, closure life expectancy, and functional operation.

BACKGROUND OF THE INVENTION

A closure allows convenient and routine access to the interior of a pressure vessel or other volumetric device. A threaded pipeline closure, for example, consists primarily of a hub added to a pipeline inlet and a removable door that seals pressure within the pipeline. A pipeline "pig" is a device which is commonly placed into a pipeline using a threaded closure. Pipelines are commonly cleaned and inspected by launching a pig into the pipeline and recovering it, sometimes along with accumulated debris, at a receiving point. Closures may thus be used to cap an end of both a pig launcher and a pig receiver.

Closures may be included on other volumetric pressure vessels, such as storage tanks. Such vessels may contain fluid at high pressures ranging from full vacuum to above 3700 psig. Closures of this type typically range in nominal pipe size from 2 to over 60 inches, corresponding with the nominal size of the vessel port or entrance to which they attach. Closures are conventionally made of metallic materials, and are often formed in a closed die forging process.

The two main components of a closure are a hub and a cap. The hub may be secured at one end to the pipeline or other vessel by welding, with threads, or with a flanged connection. The opposite end of the hub may have external/male threads to mate with internal/female threads on the cap. The cap may engage the hub to create a seal. An O-ring or other member is conventionally included on either the hub or the cap to seal the contents of the pipeline or other vessel. Heavier closures may have a hinge or other support member, such as a pivoting swing-arm, to retain the cap in the vicinity of the hub and make it easier to manipulate after being disengaged from the hub.

Prior art closures commonly include external "hammer lugs" or "wings" on the exterior of the cap, allowing the cap to be tightened or loosened with a hammer. In some cases, the hammer used can be quite large and heavy. Although caps are often constructed of resilient steel or other material, repeated hammer blows may permanently deform the lugs. With continued use, the lugs may fold back or "cauliflower," progressively cold-working and embrittling the material.

Several hazards may result from this hammering process. First, metal fragments may fly from the cap as it is struck. The fragments, traveling at high speeds, can create a health and safety hazard. To reduce this hazard, continuous maintenance may be necessary to remove any sharp edges on the cap. Second, sparks may be generated when the cap is struck. Under certain conditions, such as when operating near flammable materials, sparks may be unacceptable. In these instances, special hammers made of brass, rubber, or other materials may be required. Third, repeated hammering can cause stress cracks or other defects in the cap material and threads. These defects reduce the reliability of the closure and create the possibility of leaking and catastrophic release of pressurized fluids contained in the vessel. Hammers may also be difficult to use in confined areas. Cold climates may exacerbate these problems by making the materials more brittle.

There are also practical problems with lug-type closures. First, they require a hammer or other tools to operate. The hammer may be misplaced, or the proper size tool may not be available when needed. A large hammer can be awkward, such as when multiple closures are being serviced, especially in a confined space. If not tightened properly, the chance is greater the cap will loosen and leak, particularly when exposed to vibrations or physical shocks. Alternatively, a lug-type closure may be over tightened because it is impossible to precisely modulate the force with which the lug is struck with the hammer. If the proper size hammer is not available, there is an increased chance of improper tightening. As discussed above, the hammering process impacts wear and tear to the closure, shortening the life of the device. The above are examples of some of the shortcomings associated with the prior art.

The present invention overcomes the disadvantage of the prior art. An improved closure is provided, eliminating the need to tighten and loosen the closure using a hammer.

SUMMARY OF THE INVENTION

This invention provides methods and systems for constructing a closure for a pipeline or vessel which is relatively simple to operate, reliable, and cost effective. The closure of this invention eliminates the need for hammering on lugs to tighten or loosen the closure. The closure may be tightened or loosened by applying a substantially tangential force to a radially outward portion of the cap.

In one embodiment, the system includes a screw action of a crank-arm which selectively applies either a tightening or loosening force, through flexible member to thread or unthread the cap.

It is an object of this invention to provide a user friendly reliable closure requiring minimum maintenance. The optionally lug-free closure may eliminate the need for lug hammering and its detrimental effects.

It is a related object of this invention to provide an improved closure whereby the assembly for tightening and loosening a closure is more safe, reliable, and effective than those provided by existing methods and systems.

It is a feature of this invention that the opening and closing mechanism may be safer by virtue of its ability to prevent the closure from leaking or failing unexpectedly, such as may otherwise occur when a closure with hammer lugs is exposed to vibrations or thermal changes.

Another feature of this invention is to provide a closure which is relatively simple to operate and need not require any additional tools to operate.

Yet another feature of this invention that, by eliminating the need for hammering, the corresponding sparks and/or flying particles associated with hammering may also be eliminated, so that the closure may be used in combustible environments, or at other locations in which sparks and flying particles may be hazardous.

Another feature of the invention is an assembly for tightening and loosening the cap on a hub, with the assembly including a collar supported on an anchor and having internal threads for mating engagement with a threaded rod which passes through the collar. Rotation of either the collar or the threaded rod moves the threaded rod axially with respect to the anchor. A stop engaging member positioned on the threaded rod engages a selected one of a plurality of stops to thread and unthread the cap from the hub. In the preferred embodiment, each of a plurality of stops on the cap is a slot which extends to a periphery of the cap, with the slot including a portion substantially tangential to the periphery of the cap. A thrust bearing may be provided to reduce friction when the collar or the threaded rod is rotated relative to the anchor.

It is an advantage of this invention that, by eliminating the need for hammering, the corresponding work-hardening, stress cracks, plastic deformation, and other detrimental effects may also be significantly reduced or eliminated. A related advantage is that maintenance associated with hammer lugs may be eliminated.

A still further advantage is that the closure may not be substantially more expensive than other closures. Existing closures may also be altered or retrofitted to incorporate this invention.

These and further objects, features, and advantages of the present invention will become apparent from the following detailed description, wherein reference is made to the figures in the accompanying figures and drawings.

DETAILED DESCRIPTION OF PREFERRED EMBODIMENTS

Figure 1:
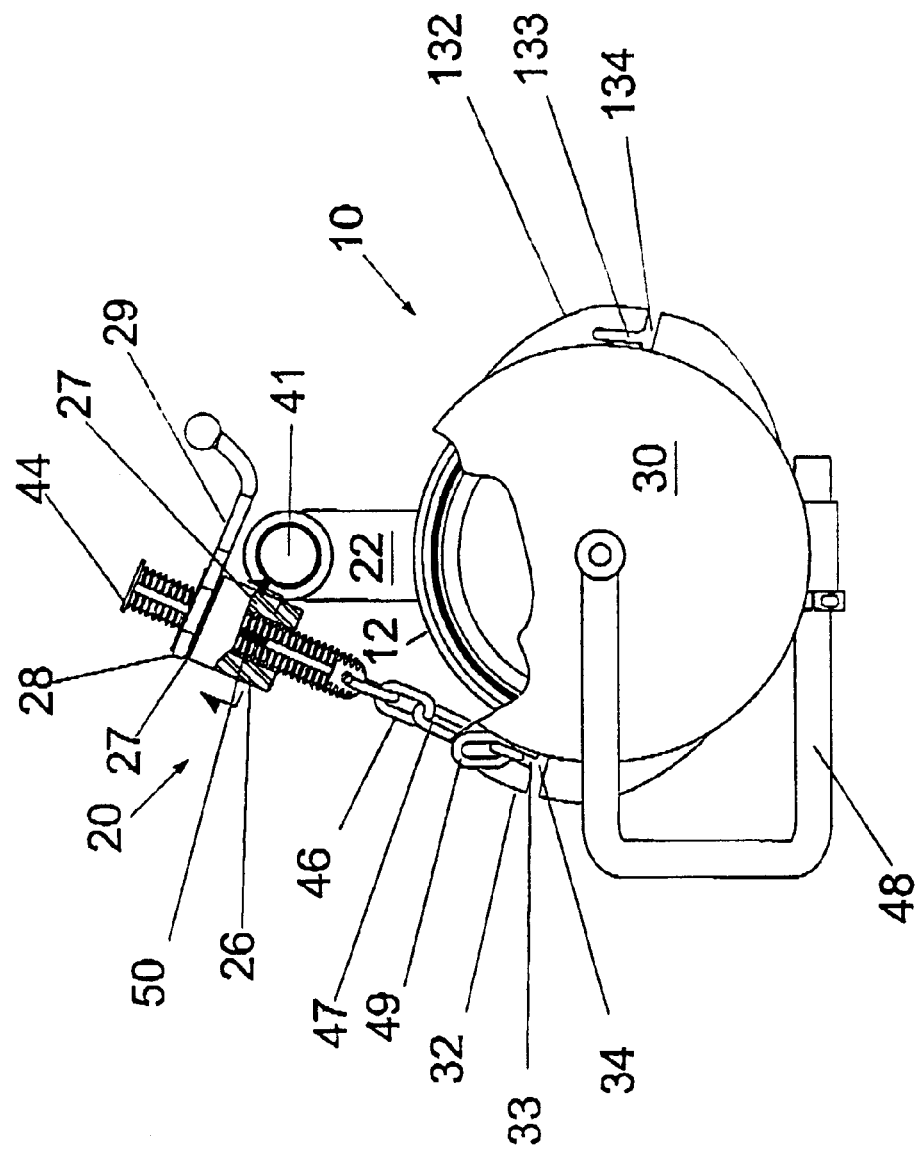
FIG. 1 is an end view of one embodiment of a closure.
Figure 1A:
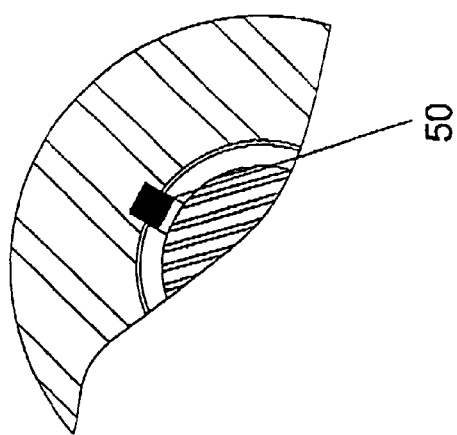
FIG. 1A illustrates a keying detail.

FIG. 1 illustrates components of a suitable closure 10 according to the present invention. The closure may be used for sealing closed an opening or port in a vessel. The term "vessel" as used herein may be defined broadly to encompass closures for pipelines, tanks, containers, or other volumetric enclosures in which a pressure internal to the vessel may be different from a pressure external to the vessel. Such volumetric enclosures may include containment vessels in which a fluid is conducted, contained, and/or processed. A closure may be manufactured substantially from metallic components.

In one embodiment, a tightening or loosening force may be applied to the closure cap 30 through a pulling assembly 20 including components that interact to apply a pulling force substantially tangential to a periphery of a closure cap 30, so as to cause the cap 30 to rotate relative to the vessel.

A closure hub 12 (see FIG. 2) may be provided to engage the closure cap 30 to secure the cap over the port. A vessel end of the hub 12 may be fixedly and sealingly secured to the vessel, e.g. by welding, threading or a flange. The hub includes a through bore 13, and provides a cap end 15 opposite the vessel end, with the cap end including cap engagement threads 16. The hub through bore 13 may have an ID at least as large as an ID of the port to the pressure vessel.

A cap 30 may include a hub engagement thread 17 for threaded engagement with the hub 12. The cap engagement thread 16 and the hub engagement thread 17 each may be a modified Acme thread. The threads 16, 17 provide for rotation of the cap 30 relative to the hub 12, with sealing engagement provided by an O-ring 21. The cap may be tightened beyond being substantially "hand tight" or relatively free turning to sealingly engage the cap 30 with the hub 12. Final rotation of the cap 30 may be accomplished by a pulling system 20 discussed below. Conversely, the cap 30 may be initially loosened from the hub 12 with a initial unthreading rotation of the cap 30 applied by the pulling system 20.

Figure 2:
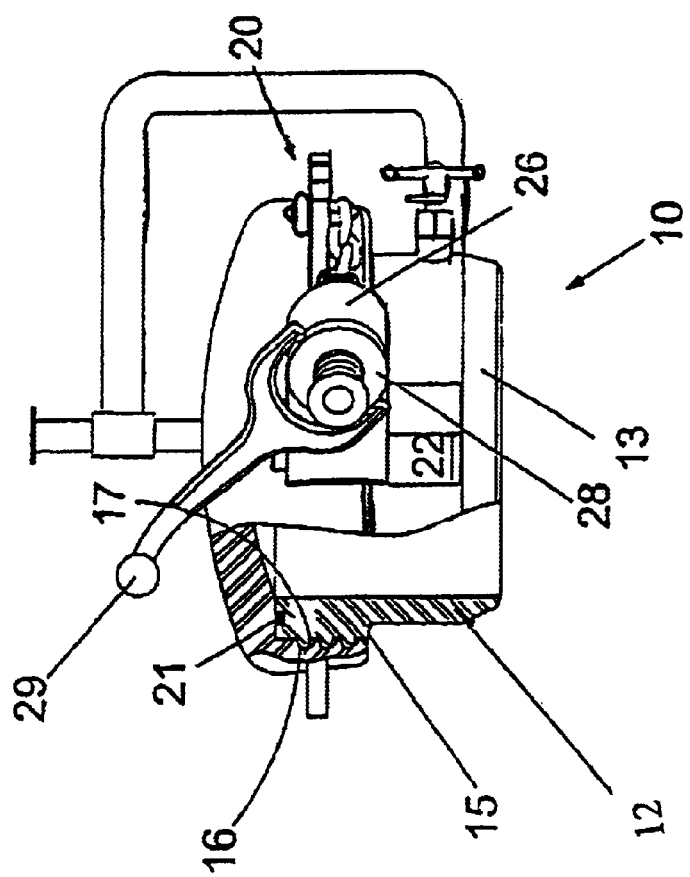
FIG. 2 is a side view in partial cross-section of the closure illustrated in FIG. 1, with the connector body positioned for closing the cap.
Figure 3:
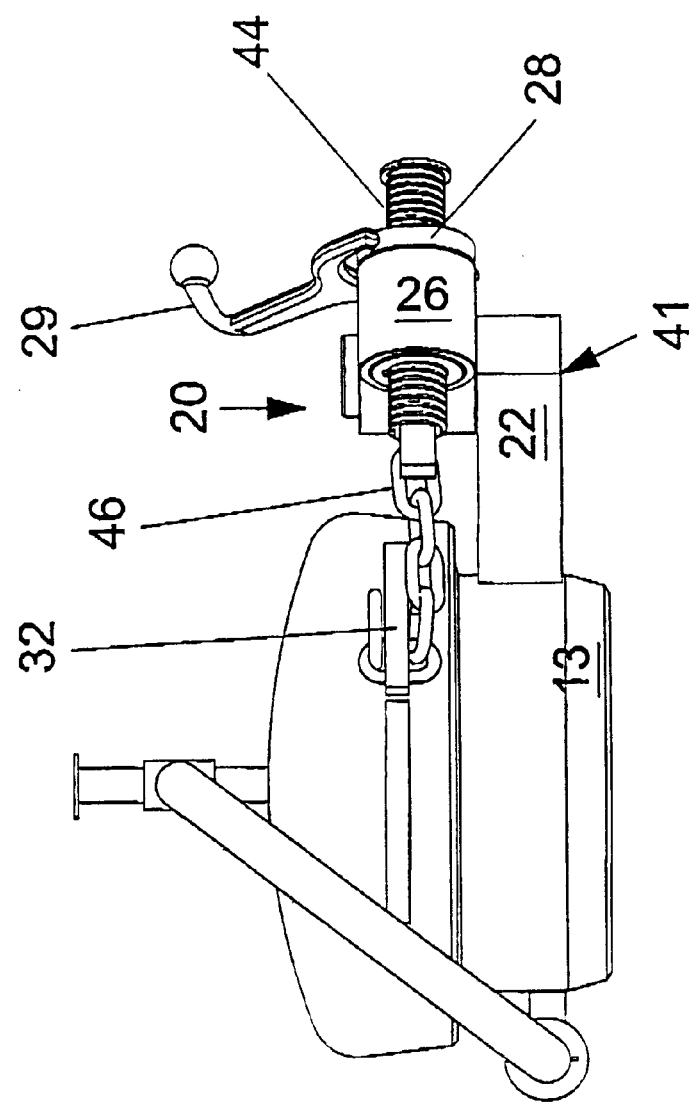
FIG. 3 is a side view with the connector body rotated approximately 90 degrees from the side view of FIG. 2, such that the connector body is positioned for opening the cap.
Figure 4:
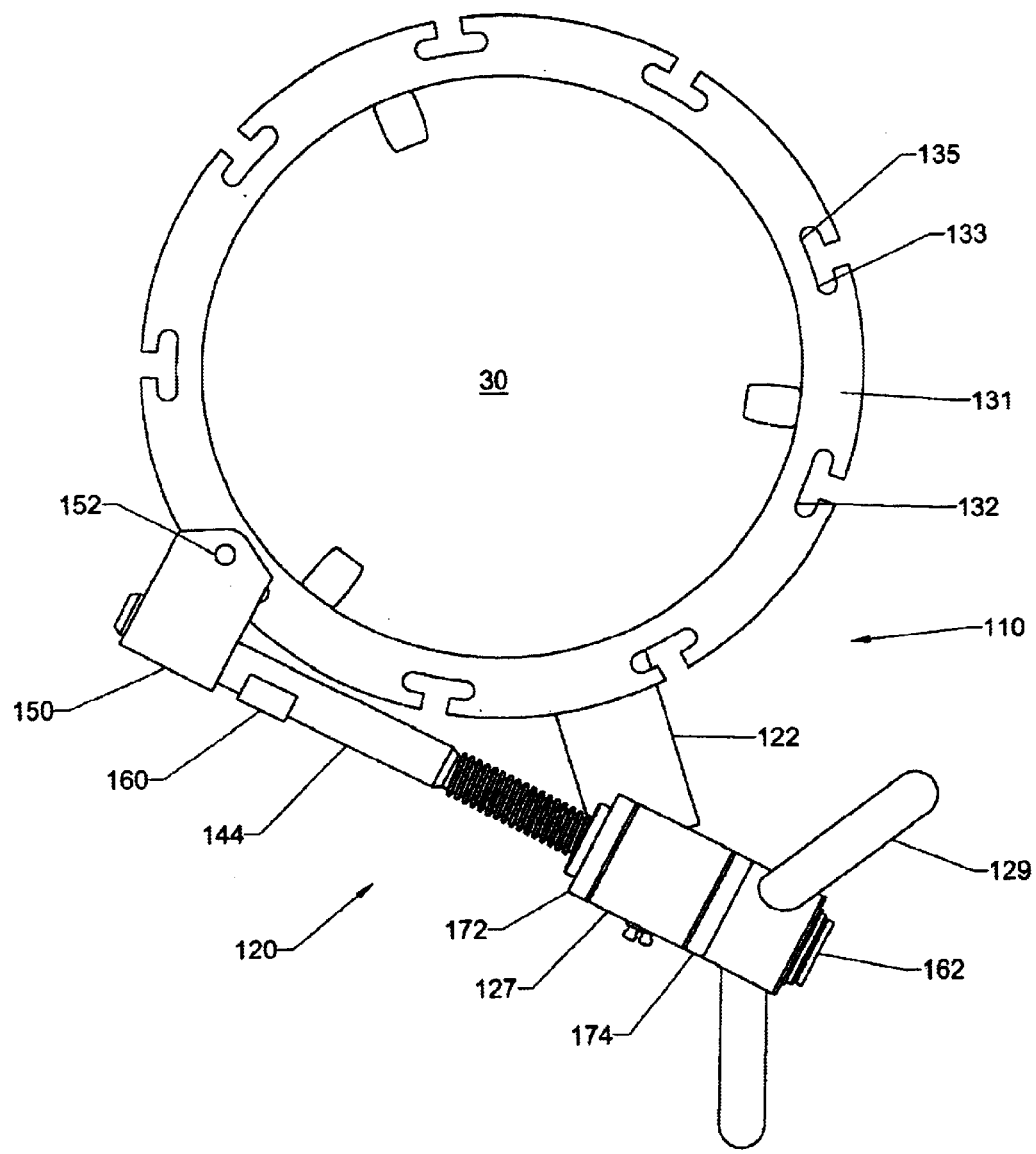
FIG. 4 is an end view of another embodiment of a closure.

In a preferred embodiment as illustrated in FIGS. 1, 2, and 3, an anchor 22 may be fixedly secured to the hub 12, or to any other stationary object such as the vessel body, which does not rotate with the cap 30. The anchor 22 may thus support the reaction force in response to the rotational force applied to the cap 30. The anchor 22 may provide a pivoting mount 41, such as a pin, hole, or profile therein, to pivotally support the connector body 26 discussed below relative to the anchor 22.

A set of one or more pulling stops 32, 132 may be incorporated with the cap 30. The first pulling stop 32 may be for tightening the cap 30 to the hub 12, and the second pulling stop 132 may be for loosening the cap 30 from the hub 12. Each pulling stop 32, 132 may comprise slots formed into the cap end, extending to a periphery of the cap 30. The pulling stop 32 may be positioned at a circumferential location on a first side of the cap 30 substantially radially opposite a second pulling stop 132. The pulling stops 32, 132 may constitute flanges each secured to the periphery of the cap 30, with the spaced apart flanges including tangential slots 33, 133 and/or radial slots 34, 134, each slot having a width slightly wider than the thickness of a chain link to allow positioning a link within a slot. An adjacent link may then serve as the stop engagement member 49 (see FIG. 2) does to the adjacent link's substantially perpendicular orientation so as to prevent it from passing through the relatively narrow slot.

A connector body 26 may be pivotally secured to the anchor 22. The connector body may have a through bore 27 to accommodate a threaded rod 44, with the ID of the through bore 27 being larger than the OD of the threaded rod 44, such that the threaded rod 44 may pass freely through the connector body 26. An anti-rotation device 50 may be included to restrict rotation of the threaded rod 44 within the connector body 26, such that the threaded rod 44 may only move axially within the connector body 26.

A threaded collar 28 may include internal threads for mating with the threaded rod 44. The collar 28 may be rotatably mounted on the connector body 26, sharing a common axis. As the collar 28 is rotated relative to the connector body 26, the threads of the collar 28 engages the threaded rod 44, advancing the threaded rod 44 axially within the connector body 26. A crank arm 29 may be included, pivotally attached to the collar 28, to facilitate rotation of the collar 28 by hand, without a need for tools.

A flexible, elongate member 46 includes one end secured to an end of the threaded rod 44. The flexible member 46 may have multiple stop engagement members 47 which selectively engage one of the pulling stops 32, 132 located on the periphery of the cap 30. The flexible member 46 may be a close-link chain, with individual links each substantially oval-shaped, and with adjacent links connected substantially perpendicular to each other.

Since the connector body 26 may be secured to the anchor 22 via the pivoting mount 41, the connector body 26 is rotatable relative to the anchor 22. Thus, the threaded rod 44 assembled within the connector body 26 may be selectively rotated to direct the flexible member 46 along a linear path tangible to the cap when engaging either the tightening stop 32 or loosening stop 132, to tighten or loosen, respectively, the cap 30.

A support member 48 may be included to support the cap 30 when fully disengaged from the hub 12. The support member 48 may consist of a hinged swing arm to retain the cap within the vicinity of the closure and to assist in its handling.

In the preferred embodiment, the pulling stops 32, 132 may include substantially tangential slots 33, 133 formed into the periphery of the cap 30. The pulling stops 32, 132 may also include a radial slot portion 34, 134. If the flexible member 46 is a chain as described above, a chain link may be positioned within one of the pulling stops 32, 132 by sliding the chain link through one of the radial slots 34, 134 and into the one of the tangential slots 33, 133. The adjacent link would then serve as the stop engagement member 47 as described above. Unless a radial slot extending to the periphery of the cap is used, the chain or other flexible member would have to be "threaded" into a hole in the flange, then a tangential slot could engage the chain. In another embodiment, the pulling stops 32, 132 may include only radial slots 34, 134, without tangential slots 33, 133. If the flexible member 46 is a chain as described above, a chain link may be positioned within one of the pulling stops 32, 132 by sliding the chain link into one of the radial slots 34, 134. The adjacent link would still serve as the stop engagement member 47 as described above.

In one embodiment, the cap 30 may include one or more additional tightening stops 32 and one or more additional pulling stops 132 to allow the operator to choose which stop 32 or 132 is best situated for engagement with the stop engagement member 47. Referring to FIG. 1, rather than provide a tightening stop at the 10:00 position and a loosening stop at the 4:00 position, two tightening stops could be provided at the 10:00 and 7:00 positions, and two loosening stops could be provided at the 2:00 and 5:00 positions. The chain 46 may thus be repositioned on a selected stop when tightening or loosening a used or worn enclosure. In another embodiment, the cap may include a plurality of stops 32, 132, equally spaced along a portion of the 360-degree periphery of the cap 30. If a flexible member 46 other than a close link chain is used, the pulling stops on the cap could be modified. A pin at the free end of chain could be positioned in spaced apart slots. A hook at the end of a chain could also engage a port in the cap flange.

Comparing FIGS. 2 and 3, connector body 26 has been repositioned from the tightening position as shown in FIG. 2 to the loosening position as shown in FIG. 3. In each position, pivoting of the connector body and thus the axis of the threaded member 44 allows the chain or other flexible member 46 to exert a force which is substantially aligned with the axis of the threaded member 44 and which is directed to periphery of the cap 30. As the cap 30 is tightened or loosened, the connector 26 may thus rotate to maintain the axis of threaded shaft 44 in line with the pulling axis of a tool chain.

Alternate embodiments of closures according to this invention may include variations of arrangements of cap engagement threads 16 and hub engagement threads 17. For example, one closure configuration may provide for cap initial engagement with the hub and rotation to sealing cap engagement with hub, wherein the cap is rotated relative to the hub for less than five 360 degree rotations, depending at least partially on closure pressure rating and size. In other embodiments, the cap may require less than one rotation for cap sealing engagement.

Other embodiments may dispense with multiple revolution threads on the cap and the hub, and instead provide a plurality of interlocking lugs or "short-threads" on each of the cap and hub, for rotational engagement of a cap and hub. In such embodiments, the cap may be rotated from initial engagement to full sealing engagement with the hub in less than one revolution, and possibly even less than one-quarter turn. Such embodiments may typically include two, three, or four sets of short-thread type interlocking lugs. Still other embodiments may include additional short-thread interlocking lugs.

In the preferred embodiments discussed above, the cap may include substantially female or internal threads 17, and the hub may include substantially male or external threads 16. However, in still other embodiments of closures according to this invention, the cap may include substantially male threads, and the hub may include substantially female threads. In the latter embodiments, the cap may essentially be a plug, and the hub a receptacle for the cap within a portion of the hub. In such embodiments, one component, either the cap or the hub, may include an anchor attached thereto, and the other component of the cap and hub may include one or more tightening or pulling stops attached thereto. A pulling assembly may be engaged thereto and between each of the anchor and the stops.

Figure 5:
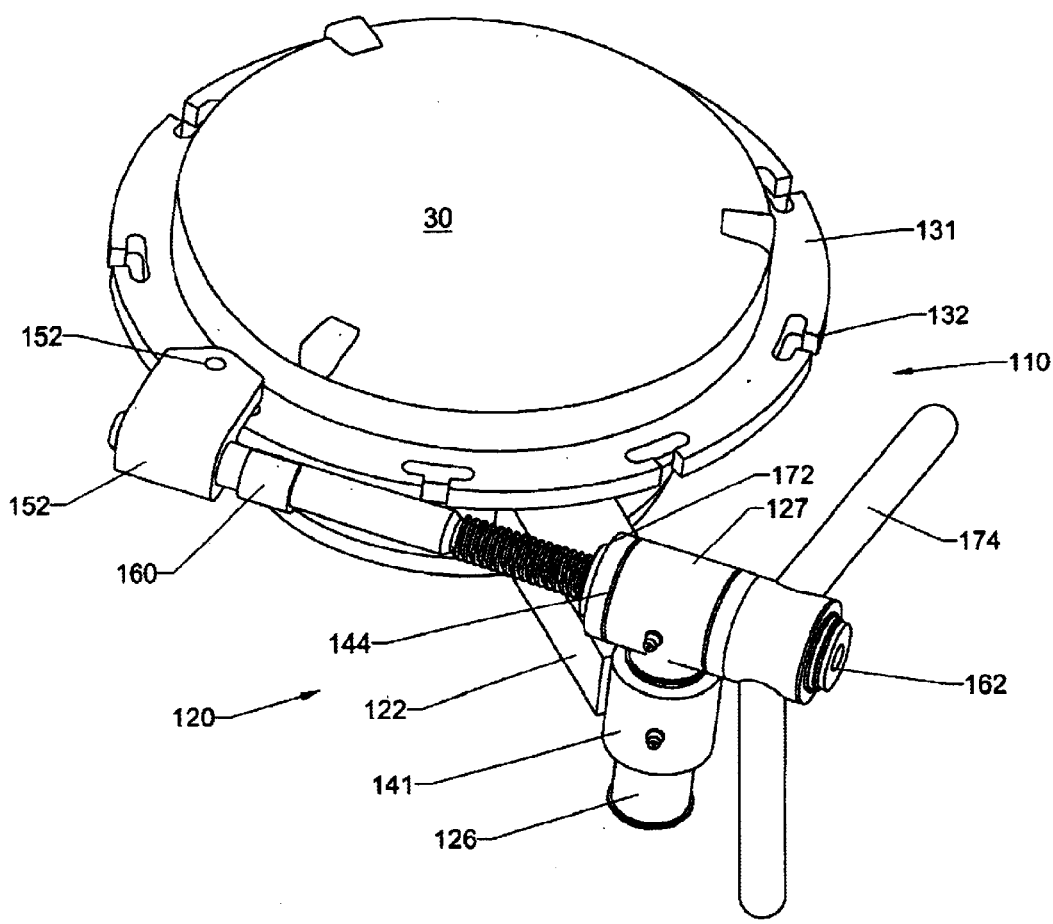
FIG. 5 is a pictorial view of the closure shown in FIG. 4.

FIG. 5 discloses another embodiment of a closure 110 which includes a closure cap 30 and an assembly 120 with components that interact to apply either a pulling force or a pushing force substantially tangential to a periphery of the closure cap, so as to cause the cap 30 to rotate relative to the vessel. Cap 30 may be as previously described, with cap engagement threads for engagement with a hub and an O-ring for maintaining a fluid-tight seal. The final rotation and the initial rotation of the cap may be accomplished by the assembly 120, which serves as both a pulling assembly and a pushing assembly to thread and unthread the cap from the hub.

Anchor 122 may be fixedly secured to the hub or to any other stationary object which does not rotate with the cap, so that the anchor is fixed with respect to the hub. The anchor 22 may thus support the reaction force in response to the rotational force applied to the cap 30. As shown more clearly in FIG. 6, the anchor 122 may be provided with a pivoting mount 141, such as a pin, hole, or profile therein, to pivotally support a collar 127, which may be provided on the end of shaft 126 which may both rotate and move axially relative to the anchor 122. The cap 30 according to the present invention is preferably provided with a flange 131, which preferably has a circular outer configuration to reduce the likelihood of an operator attempting to use a hammer to thread or unthread the cap to the hub.

A plurality of stops 132 may be incorporated at selected positions along the perimeter of the cap for both tightening and loosening the cap from the hub, as explained subsequently. Each stop 132 may comprise a slot formed into the flange 131, with the slot extending to a periphery of the cap 30. In some embodiments, the slots 132 need not be provided along the entire perimeter of the flange, although in a preferred embodiment the slots 132 may be provided at substantially equal peripheral spacings along the entire perimeter of the cap so that the assembly 120 may be used to engage any or all of the slots 132, e.g., if threading or unthreading becomes difficult at any stage, the assembly 120 may engage any selected slot.

The shaft body 126 may thus be pivotally secured to the anchor 122, and a nut component or collar 127 with an internal thread may be provided at one end of the shaft 120. The threaded rod 144 thus passes through the nut component or collar 127, with threads on the rod engaging threads on the collar 127, thereby advancing the threaded rod axially with respect to the shaft body 126 and thus the anchor 122. Crank arm 129 may be included, attached to the collar, to facilitate rotation of the collar without a need for tools. In a preferred embodiment, crank arm 129 rotates the collar 127, which in turn may be rotatably mounted within a sleeve secured to the shaft 126, so that the collar or nut may rotate but not move axially with respect to the shaft 126. Since the collar 127 is axially fixed, rotation of the collar advances the threaded rod 144 axially with respect to the anchor 122. In another embodiment, the crank 129 may be used to rotate the threaded rod 144 with respect to a collar which is rotationally fixed relative to the anchor 122, in which case the threaded rod may both move axially and may rotate relative to the anchor.

The elongate threaded rod 144 thus includes one end threaded to the collar 127, with the other end supporting bracket 150 which, in a preferred embodiment, is rotationally and axially fixed to the rod 144. A pin 152 extends from the bracket for fitting with a respective slot 132. In the alternate embodiment wherein the threaded rod 144 is rotated, bracket 152 may be rotatably mounted on the end of the rod 144, so that a sleeve portion of bracket 150 may be stationary with respect to a rotatable rod which fits through a bore in the sleeve portion.

Since the shaft body 126 may be secured to the anchor 122 via the pivot mount 141, the shaft 126, the collar 127 and the rod 144 are rotatable as an assembly relative to the anchor 122. Thus the threaded rod 144 may be selectively moved to direct the bracket 150 to engage a selected stop 132.

The stops 132 preferably are slots each extending to a periphery of the cap, and include tangential slot portions 133 and 135 formed into the periphery of the cap 30. The pin 152 may thus be positioned within one of the slots 132 by rotating the crank arm 129 and pivoting the rod 144 to slide the pin 152 into a respective slot. To tighten the cap on the hub, the operator simply rotates the handle 129, thereby axially moving the rod 144 away from the collar 127, and thereby tightening the cap while the shaft 126 and the rod 144 slowly rotate with respect to the anchor 122. To loosen the cap, the operator simply rotates the handle 129 in the reverse direction, thereby moving the rod 144 and the bracket 150 toward the support 122.

A significant advantage of the present invention is that tightening and loosening at the cap may be accomplished without moving the bracket 150 into a different slot. During the process of loosening the cap, for example, if a burr or other obstruction is encountered, the operator may retighten the cap a short distance, and thereafter resume the loosening process while the bracket 150 is retained in the same slot 132. Stop 160 is preferably provided on rod 144 for engagement with the collar 127, or with a pushing thrust bearing 172, thereby limiting axial movement of the rod with respect to the collar. A similar stop 162 may be provided on the opposing end of the rod. Once one of these stops is engaged, the operator can easily remove the bracket 150 from engagement with a slot 132, then reposition the bracket in another slot to resume the tightening or loosening operation. Pushing thrust bearing 172 is thus provided to reduce friction when either the collar or the rod is rotated relative to the anchor, and pulling thrust bearing 174 is provided for similarly reducing friction when a pulling force is being applied to the threaded rod. The embodiment of FIGS. 5 and 6 thus assumes that clockwise rotation tightens the cap to the hub and the counter-clockwise rotation loosens the cap from the hub, which is the conventional threaded arrangement for a closure. If a pulling force is desired to thread the cap to the hub, the assembly may be substantially as shown in FIGS. 5 and 6, but the rod and the bracket may then be positioned on the opposite side of the cap, so that the bracket 150 would be at approximately the 2:00 o'clock position rather than the 7:00 o'clock position as shown on FIG. 5.

In a preferred embodiment, rotation of handle 129 rotates the collar, thereby axially moving the rod 144, which does not rotate. Various types of stop engaging members other than the bracket 150 may be used for engagement with a respective slot 132. Slot 132 essentially functions as a stop for engagement with the bracket, and various types at stops may be provided with other slot configurations, or other types of stops may be provided for engaging the bracket or other member at the end of a rod. As one example, a substantially C-shaped clevis could be pivotally connected to the end of rod 144 so that the clevis rests within a selected slot 132. A pin or other stop extending from a flange could alternatively used, so that a hole in the bracket or in the rod could then be positioned on the pin to selectively attach the rod to the cap. A significant advantage of the slots 132, however, is that no member extends from the cap and is thus available for an operator to hit with a hammer in an attempt to operate the closure. The design of the present invention is thus rugged and highly reliable.

Assembly 110 as shown in FIGS. 5 and 6 may allow the rod 144 to rotate to an opposing side of the cap, although in a preferred embodiment the rod may always remain on one side of the support 122 both when tightening and loosening the cap with respect to the hub.

The method of the present invention will be apparent to those skilled in the art in view of the foregoing disclosure. After providing an assembly as discussed above, the threaded rod will mate with the threaded collar, and one end of the threaded rod may be attached to a selected one of the plurality of stops on the cap. The collar or the rod may then be rotated to selectively thread or unthread the cap from the hub. The crank arm may be rotated in a first direction to thread the cap to the hub, and may be rotated in an opposing second direction to unthread the cap from the hub while the bracket 150 remains within the same slot.

It may be appreciated that changes to the details of the illustrated embodiments and systems disclosed are possible without departing from the spirit of the invention. While preferred and alternative embodiments of the present invention have been described and illustrated in detail, it is apparent that further modifications and adaptations of the preferred and alternative embodiments may occur to those skilled in the art. However, it is to be expressly understood that such modifications and adaptations are within the spirit and scope of the present invention, set forth in the following claims.

What is claimed is:

1. A closure to sealingly enclose a port in a vessel, comprising:

a hub having a vessel end fixedly and sealingly secured to the vessel, a through bore, a cap end opposite the vessel end, and a cap engagement thread on the cap end;

a cap including a hub engagement thread for threaded engagement with the cap engagement thread;

an anchor fixedly secured with respect to the hub;

a plurality of stops each positioned along a periphery of the cap;

a collar supported on the anchor and having internal threads for mating engagement with a threaded rod;

the threaded rod passing through the collar, such that rotation of one of the collar and the threaded rod moves the threaded rod axially with respect to the anchor; and a stop engaging member positioned on the threaded rod for engagement with a selected one of the plurality of stops to thread and unthread the cap from the hub.

2. A closure as defined in claim 1, wherein each of the plurality of stops on the cap is a slot extending to a periphery of the cap.

3. A closure as defined in claim 2, wherein each slot includes a tangential slot portion substantially tangential to the periphery of the cap.

4. A closure as defined in claim 3, wherein the tangential slot extends both toward and away from the anchor.

5. A closure as defined in claim 2, wherein each slot is positioned within a flange fixed to the periphery of the cap.

6. A closure as defined in claim 1, wherein the collar is rotatably secured to the anchor, such that the collar and the threaded rod may be selectively pivoted with respect to the anchor.

7. A closure as defined in claim 1, further comprising:

a thrush bearing to reduce friction when the one of the collar and the threaded rod is rotated relative to the anchor.

8. A closure as defined in claim 1, further comprising:

a crank arm attached to the one of the collar and the threaded rod for rotating the one of the collar and the threaded rod.

9. A closure as defined in claim 1, wherein the collar is rotated relative to the anchor and the crank arm is attached to the collar.

10. A closure as defined in claim 1, further comprising:

a stop for limiting axial movement of the threaded rod with respect to the collar.

11. A closure to sealingly enclose a port in a vessel comprising:

a hub having a vessel end fixedly and sealingly secured to the vessel, a through bore, a cap end opposite the vessel end, and a cap engagement thread on the cap end;

a cap including a hub engagement thread for threaded engagement with the cap engagement thread;

an anchor fixedly secured to the hub;

a plurality of slots each positioned during a periphery of the cap;

a collar pivotally supported on the anchor and having internal threads for mating engagement with a threaded rod;

the threaded rod passing through the collar, such that rotation of one of the collar and the threaded rod moves the threaded rod axially with respect to the anchor;

a crank arm for rotating the one of the collar and the threaded rod; and a cap engaging member positioned on the threaded rod for engagement with a selected one of the plurality of slots to thread and unthread the cap from the hub.

12. A closure as defined in claim 11, wherein each slot is positioned within a flange fixed to the periphery of the cap.

13. A closure as defined in claim 12, wherein each slot comprises:

a tangential slot portion substantially tangential to the periphery of the cap.

14. A closure as defined in claim 13, wherein the tangential slot extends both toward and away from the anchor.

15. A method of sealingly enclosing a port in a vessel, comprising:

fixedly securing a vessel end of a hub to a vessel, the hub having a through bore, a cap end opposing the vessel, and a cap engagement thread on the cap end;

providing a cap for threaded engagement with the cap end of the hub;

fixedly securing an anchor with respect to the hub;

fixedly secunng each of a plurality of stops along a periphery of the cap;

supporting a collar to the anchor, the collar having internal threads for mating engagement with a threaded rod;

mating the threaded rod with the threaded collar, such that rotation one of the collar and the threaded rod advances the threaded rod axially relative to the anchor;

attaching an end of the threaded rod to a selected one of the plurality stops on the cap; and thereafter rotating the one of the collar and the threaded rod to selectively thread or unthread the cap from the hub.

16. A method of sealingly enclosing a port in a vessel as defined in claim 15, wherein each of the plurality of stops is a slot extending to a periphery of the cap.

17. A method of sealingly enclosing a port in a vessel as defined in claim 16, wherein each slot includes a tangential slot portion substantially tangential to the periphery of the cap.

18. A method of sealingly enclosing a port in a vessel as defined in claim 15, further comprising:

attaching a crank arm to rotate the one of the collar and the threaded rod.

19. A method of sealingly enclosing a port in a vessel as defined in claim 18, wherein the crank arm is rotated in a first direction to thread the cap to the hub, and is rotated in an opposing second direction to unthread the cap from the hub.

20. A method of sealingly enclosing a port in a vessel as defined in claim 18, wherein the crank arm rotates the collar with respect to the anchor to selectively thread and unthread the cap from the hub.

* * * * *